(12) United States Patent
McConnell et al.

(10) Patent No.: US 9,071,658 B2
(45) Date of Patent: Jun. 30, 2015

(54) METHOD AND SYSTEM FOR PRESENTING A MEETING IN A CLOUD COMPUTING ENVIRONMENT

(75) Inventors: Jager McConnell, San Francisco, CA (US); Ciara Peter, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 265 days.

(21) Appl. No.: 13/345,471

(22) Filed: Jan. 6, 2012

(65) Prior Publication Data

US 2013/0018953 A1 Jan. 17, 2013

Related U.S. Application Data

(60) Provisional application No. 61/507,005, filed on Jul. 12, 2011.

(51) Int. Cl.
| | |
|---|---|
| *H04L 29/06* | (2006.01) |
| *H04L 12/58* | (2006.01) |
| *H04M 7/00* | (2006.01) |
| *G06Q 10/10* | (2012.01) |

(52) U.S. Cl.
CPC .......... *H04L 65/403* (2013.01); *H04L 65/4007* (2013.01); *H04L 51/04* (2013.01); *H04M 7/0027* (2013.01); *G06Q 10/10* (2013.01); *G06Q 10/101* (2013.01); *G06Q 10/109* (2013.01)

(58) Field of Classification Search
CPC ... H04L 65/4007; H04L 65/403; H04L 51/04; G06Q 10/101; G06Q 10/1095; G06Q 10/1097; H04M 7/0027; H04M 3/56

USPC .......... 709/203–206, 217, 223, 227; 715/752, 715/757
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |

(Continued)

OTHER PUBLICATIONS

Saba, "Saba Announces Revolutionary Social Enterprise Platform," Press Release, Mar. 20, 2012, pp. 1-4, Redwood Shores, California.

*Primary Examiner* — Ramy M Osman
(74) *Attorney, Agent, or Firm* — Dergosits & Noah LLP; Todd A. Noah

(57) ABSTRACT

A method for presenting a meeting in a cloud computing environment is disclosed. The method embodiment includes providing by a server a virtual planning space in a cloud computing environment, wherein the virtual planning space is associated with a meeting and is associated with planning content comprising data objects loaded by a plurality of meeting collaborators. The method also includes receiving by the server an indication to launch the meeting, and in response, generating a virtual meeting room associated with the meeting and an identifier for the virtual meeting room. Thereafter, the server is configured to transmit a message to a plurality of meeting participants that includes an invitation to attend the meeting and the identifier for the virtual meeting room, and to present meeting content comprising at least one data object of the planning content to the meeting participants via the virtual meeting room.

18 Claims, 9 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,181,181 B2 * | 5/2012 | Ioannou .................... 718/102 |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0117446 A1 * | 6/2004 | Swanson ..................... 709/205 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0069604 A1 * | 3/2006 | Leukart et al. .................... 705/9 |
| 2006/0123082 A1 * | 6/2006 | Digate et al. .................. 709/205 |
| 2006/0190943 A1 * | 8/2006 | Haeri ........................... 718/103 |
| 2008/0120370 A1 * | 5/2008 | Chan et al. ................... 709/204 |
| 2009/0006547 A1 * | 1/2009 | Banatwala ..................... 709/204 |
| 2009/0063415 A1 | 3/2009 | Chatfield et al. |
| 2009/0119604 A1 * | 5/2009 | Simard et al. ................. 715/757 |
| 2010/0175004 A1 * | 7/2010 | Deep ............................ 709/204 |
| 2011/0154204 A1 * | 6/2011 | Narayanaswamy .......... 709/203 |
| 2012/0011450 A1 * | 1/2012 | To ............................... 715/752 |
| 2012/0278381 A1 * | 11/2012 | Ferlitsch et al. .............. 709/203 |
| 2014/0359012 A1 * | 12/2014 | Watanabe ..................... 709/204 |

* cited by examiner

DISCUSS FUTURE PLANS
11/12/11 at 10:00 AM

LAUNCH MEETING — 510

AGENDA

Asdlfkjskjdfkalsjdfkajsldkflakds;foiqekjajaksdlf;asdlkfj;al ksdjfakdjfpa;a'

COLLABORATORS (502a) +

- CIARA PETER
- JOHN STEVENS
- ED EXTERNAL
- MATT HART

TO-DO LIST AND ASSIGNMENTS (502c) +

Files and Notes (502b) — 503 +

- DOCUMENT 1.DOC — 201 KB ✕
- DOCUMENT 2.DOC — 4.2 MB ✕

COMMENTS (504) — 506

Share something...
🔒 Internal Only

CIARA PETER
Eroiqueirpqeriueoriu qeqeoiruqeoirugeiro uqeroiuqoierueoirueii
10/16/11 at 3:30 PM

ED EXTERNAL
Added a file
10/16/11 at 3:30 PM

Ciara Peter added attendee John Stevens
10/16/11 at 3:30 PM

---

MEETINGS

TODAY 10:00 AM DISCUSS FUTURE PLANS

11/12/11 DISCUSS FUTURE PLANS
11/15/11 SOME OTHER MEETING
11/16/11 SOME OTHER MEETING
12/15/11 SOME OTHER MEETING
01/15/12 SOME OTHER MEETING

ACTIVE RECORDS

ACME, INC. – 300K
CIRRUS CORPORATION
GREEN DOT MEDIA – 20 WIDGETS

DISCUSS FUTURE PLANS
11/12/11 at 10:00 AM

Meeting Participant Presentation Mode

Meeting Information
URL: http://force.ly/23497020
Dial in: (800) 484-2395 x 112
Access Code: 8909834

Create New Space From Meeting

Participants
- Ciara Peter
- Matt Hart
- John Stevens
- Ed External

Comments

Share something...

CIARA PETER
Eroiqueirpqeriueoriu
qeqeoiruqeoirnuqeiro
uqeroiuqoierueoiru
10/18/11 at 3:30 PM Ed External
Added a file
10/18/11 at 3:30 PM Notes

METHOD AND SYSTEM FOR PRESENTING A MEETING IN A CLOUD COMPUTING ENVIRONMENT

CLAIM OF PRIORITY

This application claims the benefit of U.S. Provisional Patent Application 61/507,005, filed Jul. 12, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to an automated process for organizing and managing a meeting on a cloud computing platform.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typically, a process for organizing and managing a meeting includes at least a planning phase, a presentation phase, and a post-presentation phase. The planning phase can be very cumbersome when many collaborators are involved in determining strategies, agendas, and content that should be presented during the meeting. The planning phase can be even more challenging when the collaborators are located in different offices in different cities, states, or countries. While current digital technologies enable people in dispersed locations to communicate in real time using video conferencing, instant messaging and the like, it is still challenging and difficult to gather and organize planning content, generate and organize meeting notes and minutes, and to create presentation materials during the planning phase.

During the presentation phase, typically only one or two of the meeting collaborators actually attend the meeting. The other meeting participants are usually not involved in the planning phase. The presenters typically present the presentation materials, which are usually paper-based reports/handouts, and/or digitally prepared slides that can be displayed using a visual projection system. In most cases, the handouts are costly to produce. When the number of participants exceeds the number of handouts, additional copies must be produced immediately. On the other hand, when the number of participants is less than the number of handouts, the cost of producing the extra handouts is wasted. In either case, the handouts usually are discarded or left behind by the meeting participants after the meeting. When visual slides are used, participants typically request copies of the digitally prepared slides. In order to fulfill this request, the presenter must collect the contact information of the requesting participants and must arrange for the transmission of the presentation materials to the requesting participants. This process can certainly become onerous when the number of requesting parties is large. Oftentimes, the presenter simply forgets to provide the requested materials and must be reminded by the requesting participants.

After the meeting, the meeting collaborators and/or the meeting participants typically have follow-up items and/or tasks to accomplish. Keeping track of these items and tasks is an essential function, but can be difficult for many reasons. For example, each of the individuals is usually involved in multiple meetings and multiple tasks and therefore, can easily forget that he is responsible for a follow up item. While each individual can create a personal note in a digital device, e.g., a phone or tablet computer, to remind herself of her follow up tasks, this is tedious and time consuming. Moreover, unless others generate the same notes, no one else can hold that individual accountable to the task.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 5A illustrates a web page representing to an exemplary virtual planning space according to an embodiment;

FIG. 5B illustrates a web page representing to an exemplary virtual meeting room according to an embodiment;

DETAILED DESCRIPTION

General Overview

Figure 1A:
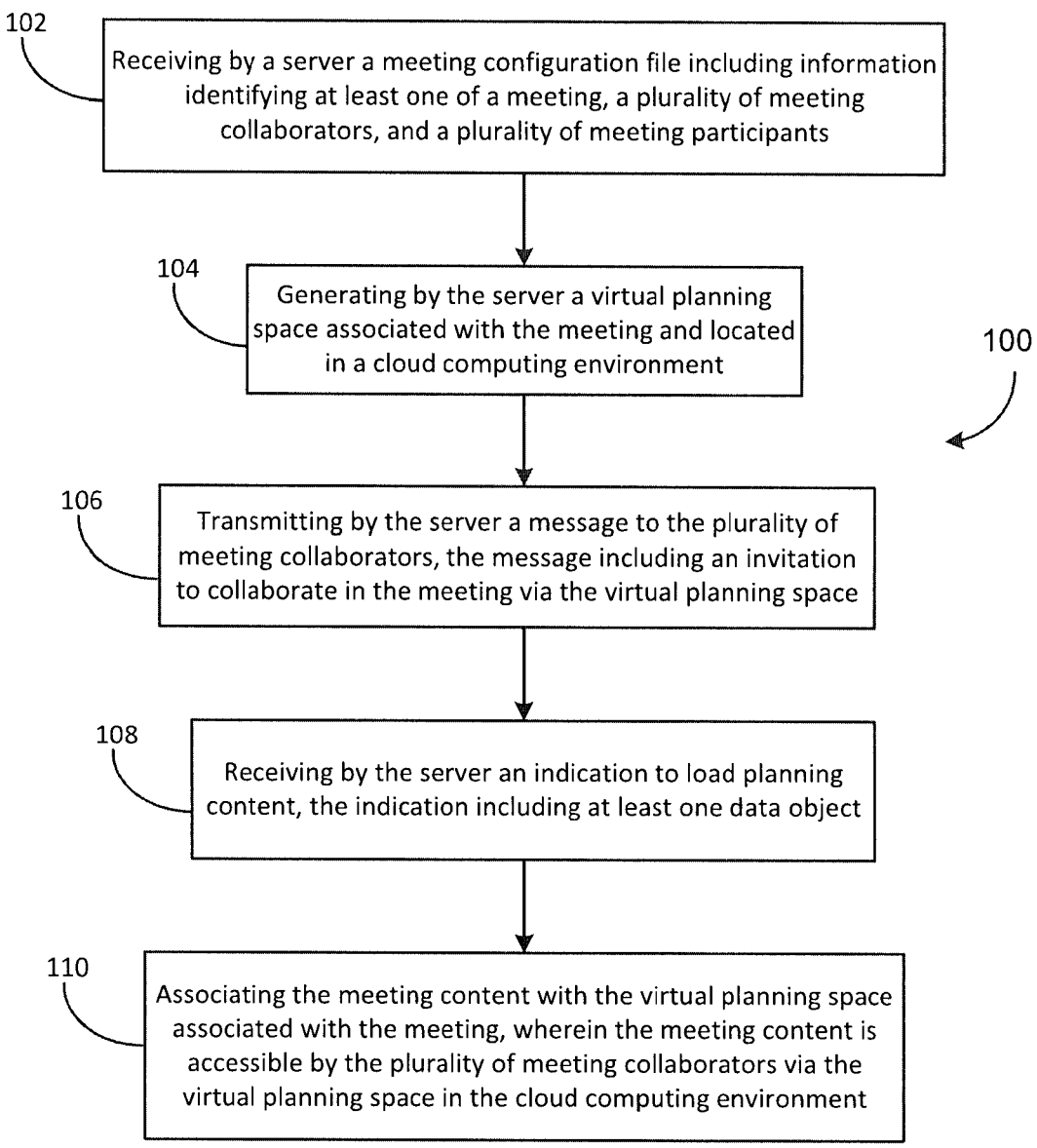
FIG. 1A is an operational flow diagram illustrating a high level overview of a technique for planning a meeting in a cloud computing environment according to an embodiment.

Systems and methods are provided for organizing and managing a meeting in a cloud computing environment. According to exemplary embodiments, a meeting facilitator service is provided to organize and manage a meeting from a planning phase, into a presentation phase, and then through a post-presentation phase.

The Planning Phase of a Meeting

In an embodiment, the meeting facilitator service is configured to receive a meeting configuration file that includes information identifying a meeting, a plurality of meeting collaborators, and a plurality of meeting participants, which includes users not identified as meeting collaborators. When the configuration file is received, the service automatically generates a virtual planning space associated with the meeting. The virtual planning space is located in a cloud computing environment according to an embodiment. In addition to generating the virtual planning space, the service automatically sends a message to the meeting collaborators identified in the meeting configuration file inviting them to collaborate in the meeting via the virtual planning space. Once the virtual planning space is generated and the meeting collaborators invited, the service is configured to receive an indication to load planning content comprising at least one data object, and in response to receiving such an indication is configured to associate the planning content with the virtual planning space. In this manner, the planning content can be collected in a central location, e.g., the virtual planning space, and can be accessed by the plurality of meeting collaborators via the virtual planning space for the meeting.

In an embodiment, the meeting facilitator service can automatically generate a to-do list that includes a plurality of tasks that require attention in the meeting planning phase, and can assign one or more meeting collaborators to be responsible for at least one of the tasks. The list can then be associated with the virtual planning space for the meeting and accessible by the meeting collaborators via the virtual planning space. In this manner, meeting collaborators can monitor and track which tasks are completed, and can distribute workloads seamlessly and transparently. In addition, the service can be configured to receive real-time comments and/or real-time video and audio feeds from the meeting collaborators, and to post and/or stream the comments and/or video feeds respectively in the virtual planning space so that real-time collaboration is possible.

In another embodiment, a data storage block can be associated with the meeting and located in a database in the cloud computing environment. In an embodiment, the meeting facilitator service can store the planning content that it receives in the data storage block associated with the meeting. In addition, other data received during the planning phase, e.g., comments and video/audio feeds, can be recorded and stored in the data storage block so that an archive of all collaboration activity is stored and available for review and/or evaluation at any time.

Figure 2:
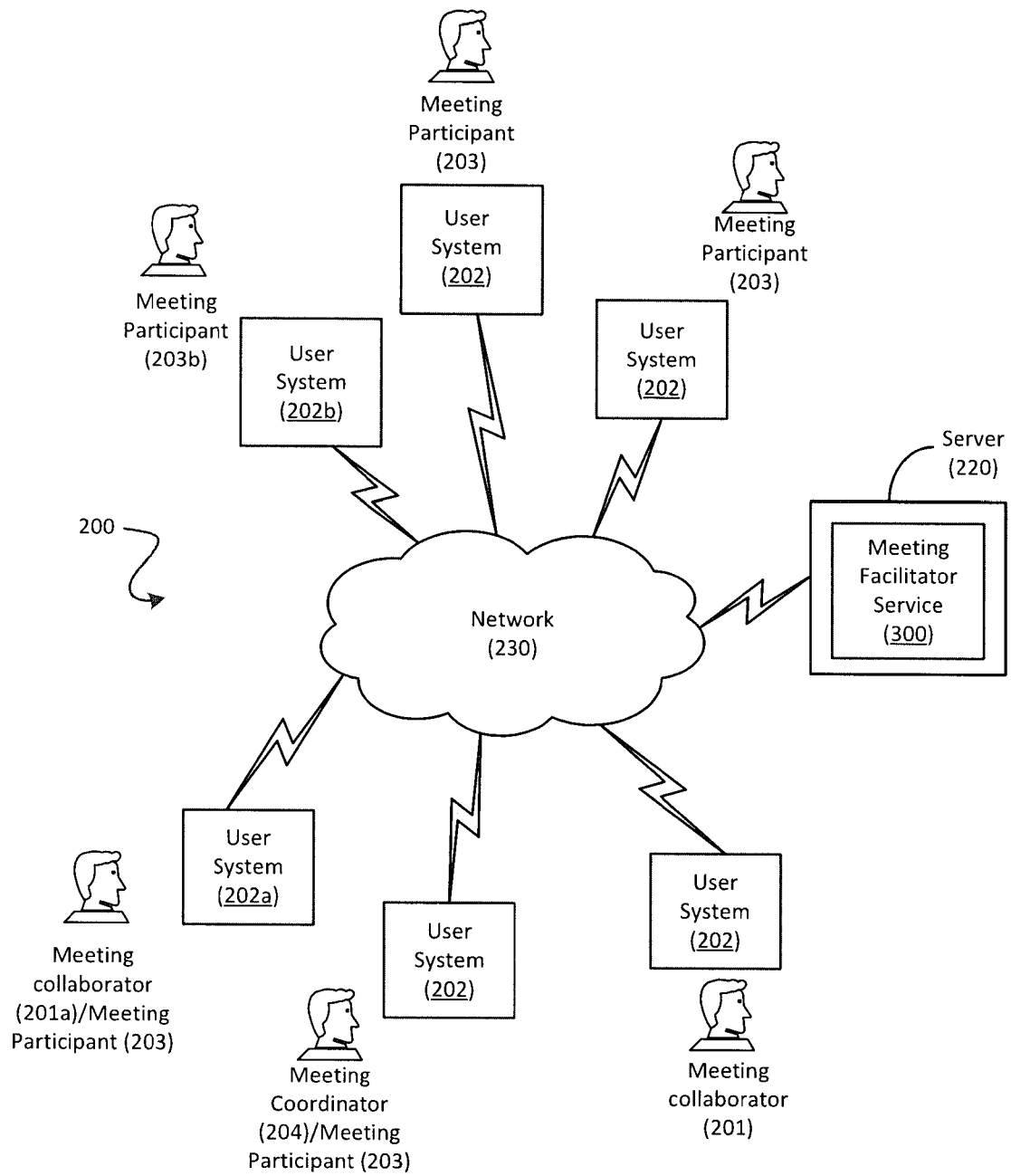
FIG. 2 illustrates a representative system for planning and presenting a meeting in a cloud computing environment according to an embodiment.
Figure 3:
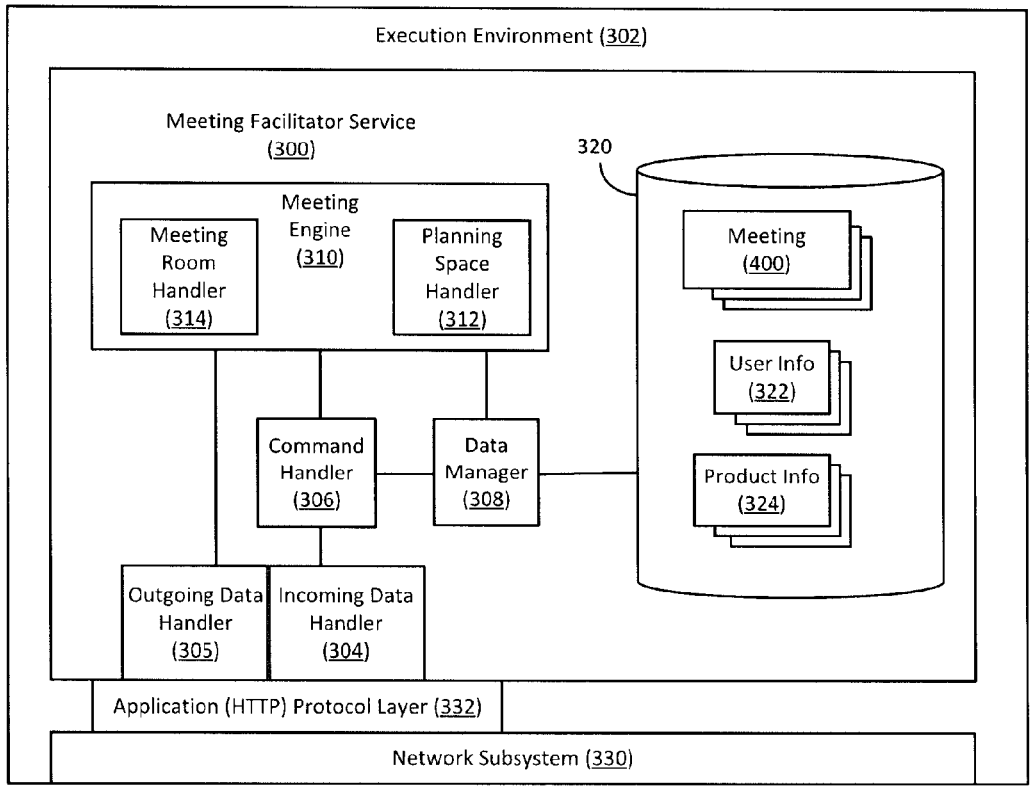
FIG. 3 is a representative system for planning and presenting a meeting in a cloud computing environment according to another embodiment.

Referring now to FIG. 1A, a flow diagram is presented illustrating a method 100 for planning a meeting in a cloud computing environment according to an embodiment. FIG. 2 illustrates a representative system 200 for planning and presenting a meeting in a cloud computing environment according to an embodiment, and FIG. 3 is a block diagram illustrating another exemplary system for planning and presenting a meeting in a cloud computing environment. In particular, FIG. 3 illustrates an arrangement of components configured to implement the method 100 of FIG. 1A, which also can be carried out in environments other than that illustrated in FIG. 3.

FIG. 3 illustrates components that are configured to operate within an execution environment hosted by a physical or virtual computer node and/or multiple computer nodes, as in a distributed execution environment. Exemplary computer nodes can include physical or virtual desktop computers, servers, networking devices, notebook computers, PDAs, mobile phones, digital image capture devices, and the like. For example, FIG. 2 illustrates a plurality of user system computer nodes 202 and an application server node 220 communicatively coupled to one another via a network 230, such as the Internet. In an embodiment, the application server 220 can be configured to provide an execution environment configured to support the operation of the components illustrated in FIG. 3 and/or their analogs. One example of such a server 220 will be described later in greater detail during reference to later illustrated embodiments.

According to an embodiment, each user system node 202 can represent a virtual or physical computer device through which a user, e.g., a meeting collaborator 201, can communicate with other users and with the application server 220 via the network 230. In an embodiment illustrated in FIG. 3, a meeting facilitator service 300 includes components adapted for operating in an execution environment 302. The execution environment 302, or an analog, can be provided by a node such as the application server node 220. The meeting facilitator service 300 can include an incoming 304 and outgoing 305 data handler component for receiving and transmitting information from and to the plurality of user system nodes 202 via the network 230.

In addition, the meeting facilitator service 300 includes a data store 320 for storing user information 322 and other data objects. In an embodiment, the data store 320 can be a database system located in a cloud computing environment, and may be implemented as a multi-tenant database system. As used herein, the term multi-tenant database system refers to those systems in which various elements of hardware and software of the database system may be shared by one or more customers. For example, a given application server 220 may simultaneously process requests for a great number of customers, and a given database table may store rows for multiple customers.

In an embodiment, the meeting facilitator service 300 can be configured to receive and store information from the user system nodes 202, and to retrieve and provide such information to the user system nodes 202 via the network 230. The network 230 can be a local area network (LAN) or a wide area network (WAN), such as the Internet. Each user system node 202 may include an application that allows network communication between the user system 202 and the meeting facilitator service 300 hosted by the application server 220. Such an application can be, in an embodiment, a web portal (not shown) provided by a network browser (e.g., Chrome, Internet Explorer, Safari, etc.) or the like that is capable of sending and receiving information to and from the application server 220.

FIG. 1A, as stated above, illustrates a method for planning a meeting in a cloud computing environment. In this case, the method 100 can be implemented in the context of the server 220 hosting the meeting facilitator service 300, but can also be implemented in any desired environment. With reference to FIG. 1A, the method 100 begins, in block 102, by receiving a meeting configuration file by the server 220 hosting the meeting facilitator service 300. In an embodiment, the meeting configuration file includes information identifying at least one of a meeting, a plurality of meeting collaborators, and a plurality of meeting participants. The meeting facilitator service 300 includes means for receiving the meeting configuration file. For example, FIG. 3 illustrates a meeting engine 310 in the meeting facilitator service 300 configured to receive the meeting configuration file.

In an embodiment, the meeting configuration file identifies, among other things, the meeting by, for example, a meeting title, and it also identifies a plurality of users who are involved in planning the meeting. These users are referred to as meeting collaborators 201. For example, when the meeting is a sales meeting with a potential or existing customer, the meeting collaborators 201 can include a marketing manager, a sales representative, at least one designer, and at least one engineer. In addition, the meeting configuration file can identify a plurality of users who will be attending the meeting. These users are referred to as meeting participants 203. In an embodiment, a meeting collaborator 201 can, but need not, be a meeting participant 203. Similarly, a meeting participant 203 can, but is not required to be a meeting collaborator 201. According to an embodiment, the meeting configuration file can be generated by a meeting coordinator 204 and provided to the server 220 via the coordinator's user system 202. The meeting coordinator 204 can also be a meeting collaborator 201 and/or a meeting participant 203.

According to an embodiment, a meeting configuration template can be used by the meeting coordinator 204 to generate the meeting configuration file. When a meeting configuration setup routine is launched by the meeting coordinator 204, the configuration template can be presented to the meeting coordinator 204 via the user system 202. The template can include fields for the meeting title, fields for identifying at least one meeting collaborator 201 and his or her contact information, e.g., an email address, and fields for identifying at least one meeting participant 203 and his or her contact information.

When the required information is entered into the template, the configuration setup routine can be configured to generate the meeting configuration file and to transmit a message including the configuration file to the meeting facilitator service 300 in the server 220 according to an exemplary embodiment. In an embodiment, the message can include a command associated with the meeting configuration file. For example, when the meeting is a new meeting, the command can be a "setup" command, while when the meeting is an existing meeting, the command can be an "update" command. In an embodiment, the meeting coordinator 204 can transmit the message to the meeting facilitator service 300 via a private and/or public network 230, such as the Internet.

According to an embodiment, the meeting facilitator service 300 is configured to receive the message from the user system 202 over the network 230 via a network subsystem 330 and an application protocol layer, or other higher protocol layer, as illustrated by an exemplary HTTP protocol layer 332, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP). A command handler component 306 in the service 300 can be configured to receive the meeting configuration file via the incoming data handler 304 and to route the file to the meeting engine 310 for further processing.

Referring again to FIG. 1A, in response to receiving the meeting configuration file, a virtual planning space associated with the meeting is generated and located in the cloud computing environment in block 104. According to an embodiment, the meeting engine 310 includes a planning space handler component 312 configured to generate a virtual planning space associated with the meeting in response to receiving the meeting configuration file.

Figure 4:
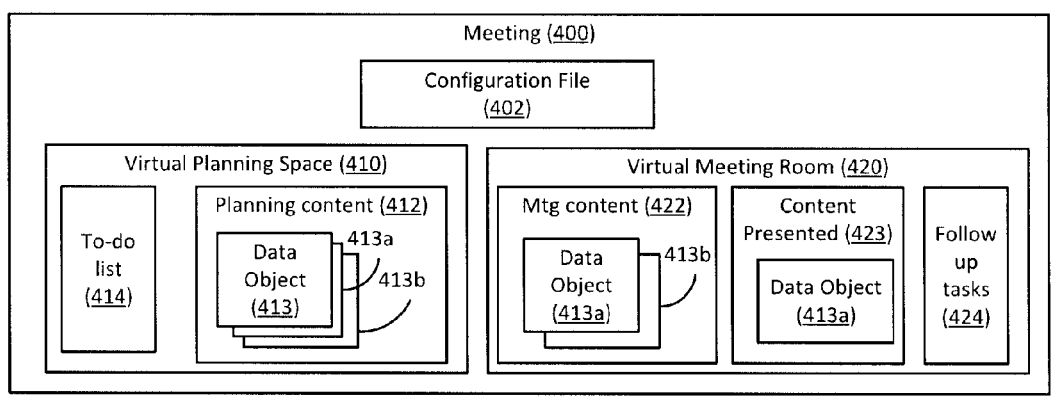
FIG. 4 is a block diagram representing an exemplary storage data block associated with a meeting according to an embodiment.

In an embodiment, when the meeting configuration file is received, the meeting engine 310 can be configured to create automatically a storage block, e.g., a data tuple or a data record, corresponding to the meeting 400, and to store the meeting block 400 in the data store 320. FIG. 4 illustrates a block diagram of an exemplary meeting block 400 of the meeting. The meeting block 400 can include the meeting configuration file 402, the virtual planning space 410 associated with the meeting, and other elements associated with the meeting.

According to an embodiment, the planning space handler component 312 in the meeting engine 310 can be configured to generate the virtual planning space 410 for the meeting when the meeting configuration file 402 is received. The virtual planning space 410 is, in an embodiment, a shared space where the meeting collaborators 201, including the meeting coordinator 204, can "gather" virtually to plan and strategize about the meeting during the planning phase. In an embodiment, the virtual planning space 410 can be a webpage that is accessed by the plurality of meeting collaborators 201 via a uniform resource locator (URL) associated with the virtual planning space 410.

Referring again to FIG. 1A, once the virtual planning space 410 is generated, a message including an invitation to collaborate in the meeting via the virtual planning space 410 is transmitted to the plurality of meeting collaborators 201 in block 106. According to an embodiment, the planning space handler component 312 in the meeting engine 310 can be configured to transmit the message to the meeting collaborators 201 inviting them to collaborate in the meeting. The invitation in the message can, in an embodiment, include the URL associated with the virtual planning space 410 so that the meeting collaborators 201 can access the space 410.

The planning space handler component 312 can determine, in an embodiment, the plurality of meeting collaborators 201 based on the meeting configuration file 402 received from the meeting coordinator 204. As stated above, the meeting configuration file 402 can include the contact information, e.g., an email address and/or a mobile phone number, for each of the meeting collaborators 201. Accordingly, in an embodiment, the planning space handler component 312 can transmit the message to each of the meeting collaborators 201 via the network 230 or via any other communication means. For example, the message can be transmitted using any supported communication protocol such as text message, IM, email or SMS.

According to an embodiment, the planning space handler component 312 can be configured to provide the invitation to collaborate to the outgoing data handler 305 in the meeting facilitator service 300. In an embodiment, the outgoing data handler 305 can be configured to build the message and to interoperate directly with the protocol layer of the network subsystem 330 or with an application protocol layer 332. The message including the invitation to collaborate can be transmitted as a whole or in parts via the network subsystem 330 over the network 230 to the user systems 202 associated with the meeting collaborators 201.

In response to transmitting the message to the plurality of meeting collaborators 201, the meeting facilitator service 300 can receive a request to access the virtual planning space 410 associated with the meeting from a meeting collaborator, e.g., 201a. When such a request is received, it can be routed to the planning space handler 312 which, in an embodiment, can retrieve the meeting block 400 associated with the meeting from the data store 320. For example, the planning space handler 312 can be configured to invoke a data manager component 308 in the meeting facilitator service 300 and to retrieve the meeting block 400. In an embodiment, the planning space handler 312 can receive the meeting block 400, identify the virtual planning space 410, and can provide access to it by the requesting meeting collaborator 201a via the collaborator's user system 202a.

According to an embodiment, prior to providing access to the virtual planning space 410, the planning space handler 312 can perform a security check to ensure that the requesting meeting collaborator 201a is authorized to access the space 410. For example, the planning space handler 312 can be configured to request and receive user credentials, e.g., a username and/or password, from the requesting collaborator 201a and to authenticate the requesting collaborator 201a by comparing the received credentials against stored user information 322. Once the requesting collaborator 201a is authenticated, the planning space handler 312 can ensure that the requesting collaborator 201a is authorized prior to providing access to the virtual planning space 410 by the collaborator 201a.

Referring again to FIG. 1A, in block 108, an indication to load planning content is received. In an embodiment, the indication includes at least one data object corresponding to the planning content to be loaded. The planning space handler component 312 can be configured to receive the indication to load planning content, where the indication includes at least one data object. In an embodiment, the data object(s) can include, but is not limited to, a text document, an image file, an audio file, a link to a webpage, and a video file. Alternatively or in addition, the indication to load planning content can include information identifying the data object(s). For example, a URL associated with a web page or a document can be included in the indication.

Referring again to FIG. 1A, in response to receiving the indication, the planning content is associated with the virtual planning space 410 associated with the meeting in block 110. In an embodiment, the planning space handler component 312 can be configured to associate the planning content 412 with the virtual planning space 410 associated with the meeting. In this manner, the planning content 412 is accessible by the plurality of meeting collaborators 201 via the virtual planning space 410 in the cloud computing environment.

According to an embodiment, when the indication is received, the planning space handler 312 can be configured to store the planning content 412, i.e., the data object(s) 413, in the meeting block 400 associated with the meeting and to link the data object(s) to the virtual planning space 410 so that the meeting collaborators 201 can access the data object(s) 413 via the virtual planning space 410. In an embodiment, the virtual planning space 410 can be a web page that includes one or more presentation windows that are reserved for displaying certain types of information. For example, a first presentation window can be configured to display icons representing meeting collaborators 201, a second presentation window can be configured to display a list of relevant documents such as technical manuals, and another presentation window can be configured to display products. According to an embodiment, the planning space handler 312 can be configured to determine a type associated with the data object 413 and to link the data object 413 to at least one presentation window in the virtual planning space 410 corresponding to the data object's type.

FIG. 5A illustrates a web page representing an exemplary virtual planning space according to an embodiment. The virtual planning space web page 500 can include a presentation window for collaborators 502a that displays profile images of each collaborator 201. In an embodiment, selected user information 322 associated with a collaborator 201 can be displayed, e.g., in a pop-up window (not shown), when a cursor is placed over the profile image of the collaborator 201. For example, the selected user information 322 displayed can be the collaborator's job title, department, and/or contact information. Alternatively or in addition, a drop-down menu of actions, e.g., send email message, call, send text message, can be displayed when the image is selected.

The virtual planning space web page 500 can also at least one presentation window for data objects 413 loaded as planning content 412. For example, the web page 500 can include a presentation window for files and meeting notes 502b. In an embodiment, a file and/or notes referred to in the presentation window 502b can be displayed to the viewer, i.e., a collaborator 201a, when an icon associated with the file and/or notes is selected in the presentation window 502b. Alternatively or in addition, a drop-down menu of actions, e.g., save, download and print, can be displayed when the icon is selected.

According to an embodiment, the virtual planning space web page 500 can also include a presentation window for products (not shown) that are the subject of the meeting. For example, when the meeting is a sales meeting to provide computer devices to a customer, the presentation window for products can display a list of computer devices that the customer is interested in purchasing or leasing. In an embodiment, selected product information 324 associated with the product can be displayed, e.g., in a pop-up window (not shown), when a cursor is placed over the icon associated with the product in the presentation window. For example, the selected product information 324 displayed can be the product's technical specifications, its price, and standard features. Alternatively or in addition, when the icon is selected, a drop-down menu of actions can be displayed to the viewer. In an embodiment, the actions can include purchasing the product, submitting a question about the product, getting a quote, and/or determining an inventory of the product.

In an embodiment, a meeting collaborator 201 can add planning content 412 to the virtual planning space 410 via the virtual planning space web page 500. For example, the web page 500 can include a data object add field 503 that allows the meeting collaborator 201 to search for and/or identify a data object 413 which is included in an indication to load planning content 412.

Alternatively or in addition, the virtual planning space web page 500 can include a presentation window 504 for displaying real-time comments from the plurality of meeting collaborators 201. According to an embodiment, a meeting collaborator 201 can type comments in a comment field 506 in the comments presentation window 504 and submit the comments to the meeting facilitator service 300 via the network 230. The comments can be received by the incoming data handler 304 and routed to the planning space handler component 312 via the command handler 306. In an embodiment, the planning space handler 312 can be configured to receive the comments in real-time and to post the comments immediately in the virtual planning space 410 so that the comments can be displayed in the comments presentation window 504 substantially in real-time. According to an embodiment, the comments received by the planning space handler 312 can also be stored as planning content 412 in the meeting block 400 associated with the meeting.

In yet another embodiment, upon request or automatically, the planning space handler component 312 can be configured to generate a to-do list 414 comprising a plurality of tasks that need to be completed during the planning phase for the meeting. For example, the meeting facilitator service 300 can receive an indication from the meeting coordinator 204 over the network 230 that includes a command to create a to-do list 414 for the meeting. The indication can be received by the incoming data handler 304 and routed to the planning space handler 312 via the command handler 306. When received, the planning space handler 312 can, in an embodiment, provide a to-do list template to the meeting coordinator 204, which allows the coordinator 204 to define the plurality of tasks. Alternatively, or in addition, the planning space handler 312 can present a menu of typical tasks, and the coordinator 204 can be allowed to select tasks from the menu. The menu of typical tasks, for example, can be based on at least one of other meetings in general, other meetings involving the type of product, other meetings involving the customer, and/or the coordinator's 204 preferences.

In an embodiment, when the tasks for the to-do list 414 have been defined, the planning space handler 312 can be configured to assign at least one of the plurality of meeting collaborators 201 to perform at least one of the plurality of tasks. The planning space handler 312 can be configured to assign a task(s) automatically to a meeting collaborator 201, e.g., based on a role or skill of a collaborator 201. Alternatively or in addition, in another embodiment, the meeting coordinator 204 can explicitly assign task(s) to particular collaborator(s) 201, and/or the collaborator(s) 201 can choose to which tasks to be assigned. The task assignments can be included with the to-do list 414 in an embodiment.

The planning space handler 312 can further be configured to associate the to-do list 414 with the virtual planning space 410 associated with the meeting so that the list 414 and task assignments can be displayed to the meeting collaborators 201. For example, in an embodiment, the to-do list 414 and the task assignments can be displayed in a presentation window 502c in the virtual planning space web page 500. In this manner, meeting collaborators 201 can monitor and track which tasks are completed, and can distribute workloads seamlessly and transparently between meeting collaborators 201. According to an embodiment, the planning space handler 312 can also store the to-do list 414 and the task assignments in the meeting block 400 associated with the meeting.

According to exemplary embodiments, the plurality of meeting collaborators 201 can access the virtual planning space 410 from any location, at any time, and from any user system node 202 because the virtual planning space 410 is located in the cloud computing environment and accessed over the Internet 230. During the planning phase, content 412 for the meeting can be uploaded and shared between the meeting collaborators 201 and stored in a central location, i.e., the virtual planning space 410, where it can be easily organized, categorized, retrieved and displayed. Text comments and video/audio feeds can be transmitted in real time through the virtual planning space 410 so that the meeting collaborators 201 can interact with each other without being in the same physical location. Accordingly, the virtual planning space 410 can be an effective organization tool and a valuable portal for collaboration when talented personnel are located in various offices and/or in various locations.

The Presentation Phase of the Meeting

When preparations for the meeting have ended, the planning phase is complete and the presentation phase begins. In an embodiment, the meeting facilitator service 300 is configured to receive an indication to launch the meeting. The indication can be received, for example, from the meeting coordinator 204 over the network 230. When the indication is received, the service 300 automatically generates a virtual meeting room associated with the meeting and an identifier for a virtual meeting room, which is located in the cloud computing environment according to an embodiment. In addition, the service 300 automatically transmits the identifier for the virtual meeting room to the meeting participants 203 identified in the meeting configuration file 402 inviting them to attend the meeting via the virtual meeting room. Once the virtual meeting room is generated and the meeting participants 203 invited, the service 300 is configured to receive and provide meeting content comprising at least a portion of the planning content to the plurality of meeting participants via the virtual meeting room. In this manner, the meeting content can be provided from a central location, e.g., the virtual meeting room, and can be accessed by the plurality of meeting participants 203 via the virtual meeting room for the meeting.

In an embodiment, the meeting facilitator service 300 can store the meeting content that it receives in the data storage block, i.e., the meeting block 400, associated with the meeting. In addition, other data received during the presentation phase, e.g., comments and video/audio feeds, can be recorded and stored in the meeting block 400 so that an archive of all meeting activity is stored and available for review and/or evaluation at any time.

Figure 1B:
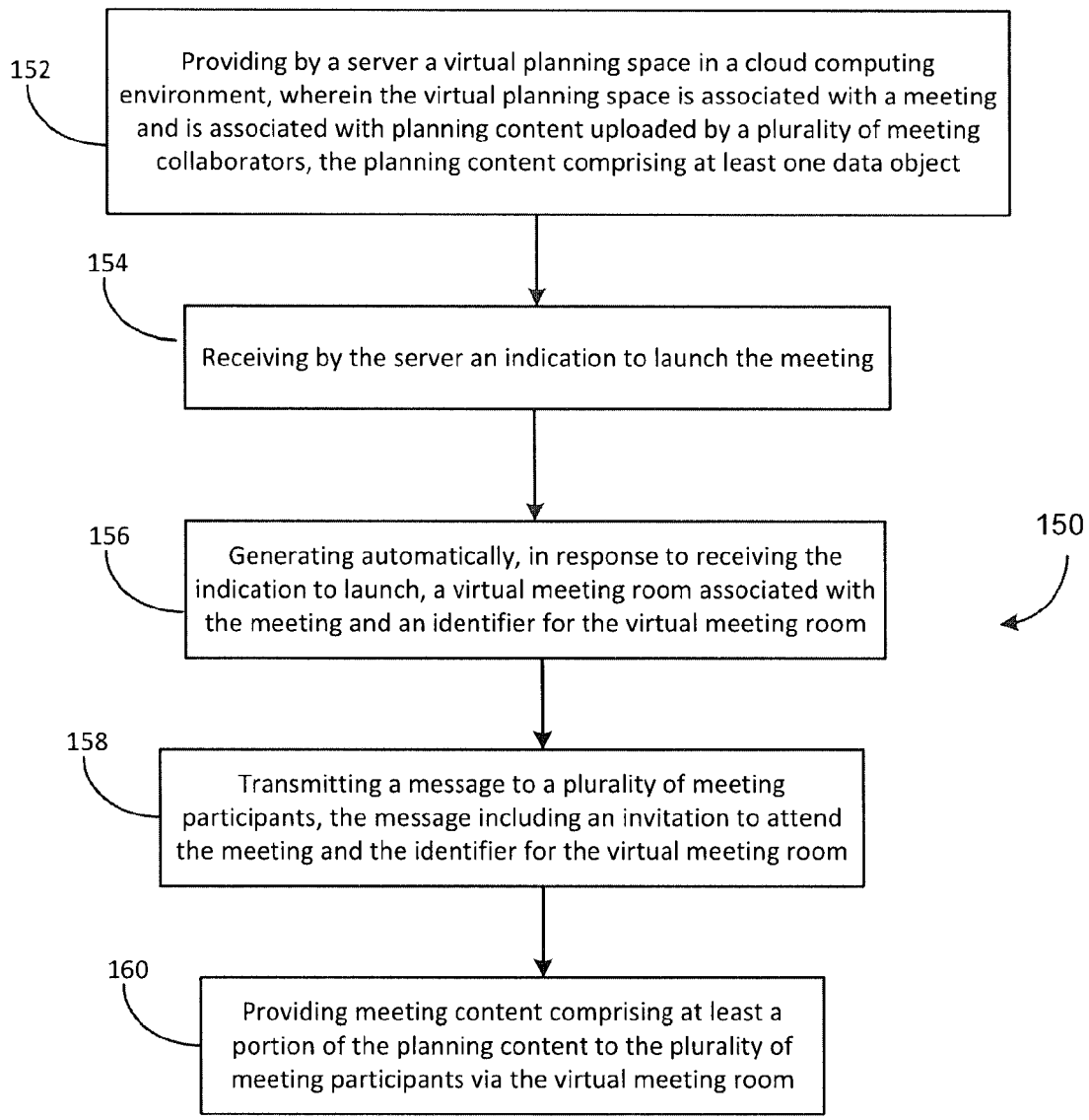
FIG. 1B is an operational flow diagram illustrating a high level overview of a technique for presenting a meeting in a cloud computing environment according to an embodiment.

Referring now to FIG. 1B, a flow diagram is presented illustrating a method 150 for presenting a meeting in a cloud computing environment according to an embodiment. As stated above, FIG. 2 illustrates a representative system 200 for planning and presenting a meeting in a cloud computing environment according to an embodiment, and FIG. 3 is a block diagram illustrating another exemplary system for planning and presenting a meeting in a cloud computing environment. In particular, FIG. 3 illustrates an arrangement of components configured to implement the method 150 of FIG. 1B, which also can be carried out in environments other than that illustrated in FIG. 3.

FIG. 1B, as stated above, illustrates a method for presenting a meeting in a cloud computing environment. In this case, the method 150 can be implemented in the context of the server 220 hosting the meeting facilitator service 300, but can also be implemented in any desired environment. With reference to FIG. 1B, the method 150 begins, in block 152, by providing a virtual planning space 410 in a cloud computing environment, wherein the virtual planning space 410 is associated with a meeting and is associated with planning content 412 uploaded by a plurality of meeting collaborators 201, the planning content 412 comprising at least one data object 413. Exemplary embodiments of providing the virtual planning space 410 have been described above, and, in the interest of brevity, that discussion is incorporated by reference here in its entirety.

Once the virtual planning space 410 is provided and the planning phase is completed, the method 150 includes receiving an indication to launch the meeting in block 154. According to an embodiment, the meeting engine 310 in the meeting facilitator service 300 can be configured to receive the indication to launch the meeting. The indication can be generated by the meeting coordinator 204 and/or a meeting collaborator 201 and provided to the application server 220 via the user system 202. For example, referring again to FIG. 5A, a launch meeting button 510 can be provided in the virtual planning space web page 500, which when selected can automatically transmit the indication to the server 220 over the network 230.

According to an embodiment, the meeting facilitator service 300 can be configured to receive the indication from the user system 202 over the network 230 via the network subsystem 330 and the application protocol layer 332. The command handler component 306 in the service 300 can be configured to receive the indication via the incoming data handler 304 and to route the indication to the meeting engine 310 for further processing.

Referring again to FIG. 1B, in response to receiving the indication to launch, a virtual meeting room associated with the meeting and located in the cloud computing environment, and an identifier for the virtual meeting room are generated in block 156. According to an embodiment, the meeting engine 310 includes a meeting room handler component 314 configured to generate the virtual meeting room associated with the meeting and the identifier for the virtual meeting room in response to receiving the indication to launch the meeting. In an embodiment, the virtual meeting room 420 can be stored in the meeting block 400 along with the virtual planning space 410.

When the virtual meeting room 420 is generated, the meeting room handler component 314 can be configured to determine, in an embodiment, meeting content 422 that can be presented during the meeting. For example, the meeting room handler 314 can transmit a message to the meeting coordinator 204 and/or the meeting collaborators 201 that includes a request to upload meeting content 422 into the virtual meeting room 420. In an embodiment, at least a portion of the planning content 412, e.g., data objects 413a, 413b, in the virtual planning space 410 can be selected and uploaded as meeting content 422 into the virtual meeting room 420. In another embodiment, an original data object (not shown) can be uploaded into the virtual meeting room 420 as meeting content 422. For example, a slideshow presentation or video clip prepared specifically for the meeting can be uploaded as an original data object.

According to an embodiment, in response to the request to upload meeting content 422, the meeting room handler 314 can receive an indication to load meeting content 422 from the meeting coordinator 204 and/or the meeting collaborators 201. The indication can include the data object(s) 413a, 413b, and/or information identifying the data object, e.g., a URL associated with a web page or a document. When the indication is received, the meeting room handler 314 can be configured to associate the meeting content 422 with the virtual meeting room 420 associated with the meeting. For example, the meeting room handler 314 can be configured to store the meeting content 422, e.g., the data object(s) 413a, 413b, in the meeting block 400 associated with the meeting and to link the data object(s) to the virtual meeting room 420. In this manner, meeting content 422 can be organized and stored in a central location so that it is easily accessible during the meeting.

The virtual meeting room 420 is, in an embodiment, a shared space where the meeting participants 203, which can include at least one meeting collaborator, e.g., 201a and/or the meeting coordinator 204, can "gather" virtually for the meeting during the presentation phase of the meeting. In an embodiment, the virtual meeting room 420 is similar to the virtual planning space 410, in that it can be a web page provided by the meeting facilitator service 300. In this embodiment, the identifier for the virtual meeting room 420 can be a URL for the virtual meeting room 420 that can be used to access the virtual meeting room 420.

Referring again to FIG. 1B, once the virtual meeting room 420 is generated and the meeting content 422 selected and associated with the virtual meeting room 420, a message including an invitation to attend the meeting and the identifier for the virtual meeting room 420 is transmitted to the plurality of meeting participants 203 in block 158. According to an embodiment, the meeting room handler component 314 in the meeting engine 310 can be configured to transmit the message to the meeting participants 203 inviting them to attend the meeting. The invitation in the message can, in an embodiment, include information about the meeting, e.g., date and time, and the URL associated with the webpage representing virtual meeting room 420 so that the meeting participants 203 can access the virtual meeting room 420 at the designated date and time.

The meeting room handler component 314 can determine, in an embodiment, the plurality of meeting participants 203 based on the meeting configuration file 402 stored in the meeting block 400 and received from the meeting coordinator 204. As stated above, the meeting configuration file 402 can include the contact information, e.g., an email address and/or a mobile phone number, for each of the meeting participants 203. Accordingly, in an embodiment, the meeting room handler component 314 can transmit the message to each of the meeting participants 203 via the network 230 or via any other communication means. For example, the message can be transmitted using any supported communication protocol such as text message, IM, email or SMS.

According to an embodiment, the meeting room handler component 314 can be configured to provide the invitation to attend the meeting to the outgoing data handler 305 in the meeting facilitator service 300. In an embodiment, the outgoing data handler 305 can be configured to build the message and to interoperate directly with the protocol layer of the network subsystem 330 or with the application protocol layer 332. The message including the invitation can be transmitted as a whole or in parts via the network subsystem 330 over the network 230 to the user systems 202 associated with the meeting participants 203.

In response to transmitting the message to the plurality of meeting participants 203, the meeting facilitator service 300 can receive a request to access the virtual meeting room 420 associated with the meeting from a meeting participant, e.g., 203b. When such a request is received, it can be routed to the meeting room handler 314 which, in an embodiment, can retrieve the meeting block 400 associated with the meeting. For example, the meeting room handler 314 can be configured to invoke the data manager component 308 in the meeting facilitator service 300 and to retrieve the meeting block 400. In an embodiment, the meeting room handler 314 can receive the meeting block 400, identify the virtual meeting room 420, and can provide access to it by the requesting meeting participant 203a via the participant's user system 202b.

According to an embodiment, prior to providing access to the virtual meeting room 420, the meeting room handler 314 can perform a security check to ensure that the requesting meeting participant 203a is authorized to access the meeting room 420. For example, the meeting room handler 314 can be configured to request and receive user credentials, e.g., a username and/or password, from the requesting participant 203a and to authenticate and authorize the requesting participant 203a by comparing the received credentials against stored user information 322. Alternatively, or in addition, the meeting room handler 314 can restrict access to the virtual meeting room 420 based on other considerations, such as the date and time of the meeting. For example, when the request to access the virtual meeting room 420 is received before the date and time of the meeting, the request can be denied on the basis that the virtual meeting room is "closed." Once the requesting participant 203a is authenticated, authorized, and/or the virtual meeting room 420 is "open," the meeting room handler 314 can provide access to the virtual meeting room 420 by the meeting participant 203a.

FIG. 5B illustrates a web page representing an exemplary virtual meeting room 420 provided to a meeting participant 203a according to an embodiment. The virtual meeting room web page 520 can include a presentation window for meeting information 552a that provides, for example, the URL associated with the web page, and dial-in and access code information for attending the meeting. In an embodiment, the virtual meeting room web page 520 can include presentation windows 554, 556 for taking notes and for displaying meeting content, respectively, during the meeting. In addition, the web page 520 can include a presentation window 552b that displays profile images of each meeting participant 203. In an embodiment, information associated with a participant 203 can be displayed, e.g., in a pop-up window (not shown), when a cursor is placed over the profile image of the participant 203. Alternatively or in addition, a drop-down menu of actions, e.g., send email message, call, send text message, can be displayed when a profile image is selected.

Alternatively or in addition, the virtual meeting room web page 520 can include a presentation window 552c for displaying real-time comments from the plurality of meeting participants 203. According to an embodiment, a meeting participant 203a can type comments in a comment field 553 in the comments presentation window 552c and submit the comments to the meeting facilitator service 300 via the network 230. The comments can be received by the incoming data handler 304 and routed to the meeting room handler component 314 via the command handler 306. In an embodiment, the meeting room handler 314 can be configured to receive the comments in real-time and to post the comments immediately in the virtual meeting room 420 so that the comments can be displayed in the comments presentation window 552c substantially in real-time. According to an embodiment, the comments received by the meeting room handler 314 can also be stored as meeting content 422 and/or content presented 423 during the meeting in the meeting block 400 associated with the meeting.

Alternatively, or in addition, the virtual meeting room web page 520 can also include a presentation window 552d for presenting video and/or audio data corresponding to activities of at least some of the plurality of meeting participants 203 during the meeting. According to an embodiment, a meeting participant 203b can enable a camera and microphone provided by the user system 202b to stream real-time video and audio data to the meeting room handler component 314 in the meeting facilitator service 300 via the network 230. In an embodiment, the meeting room handler 314 can be configured to receive the video and audio data in real-time, associate it with the participant 203b and to post the video and audio data immediately in the virtual meeting room 420 so that the video and audio data can be displayed in the presentation window 552d substantially in real-time. According to an embodiment, the video and audio data received by the meeting room handler 314 can also be recorded and stored as meeting content 422 and/or content presented 423 during the meeting in the meeting block 400.

Referring again to FIG. 1B, in block 160, meeting content 422 comprising at least one data object of the planning content 412 is presented to the plurality of meeting participants 203 via the virtual meeting room 420. In an embodiment, the meeting content presented 423 during the meeting can be controlled by the meeting coordinator 204 and/or by the meeting collaborator 201a who are also meeting participants 203. In this embodiment, the meeting room handler 314 can be configured to receive an indication during the meeting to present meeting content 422 from the meeting coordinator 204 and/or the collaborator 201a. In an embodiment, the indication can include information identifying the meeting and an identifier, e.g., a filename and/or a URL, associated with a data object, e.g., 413a, selected for presentation.

Figure 5C:
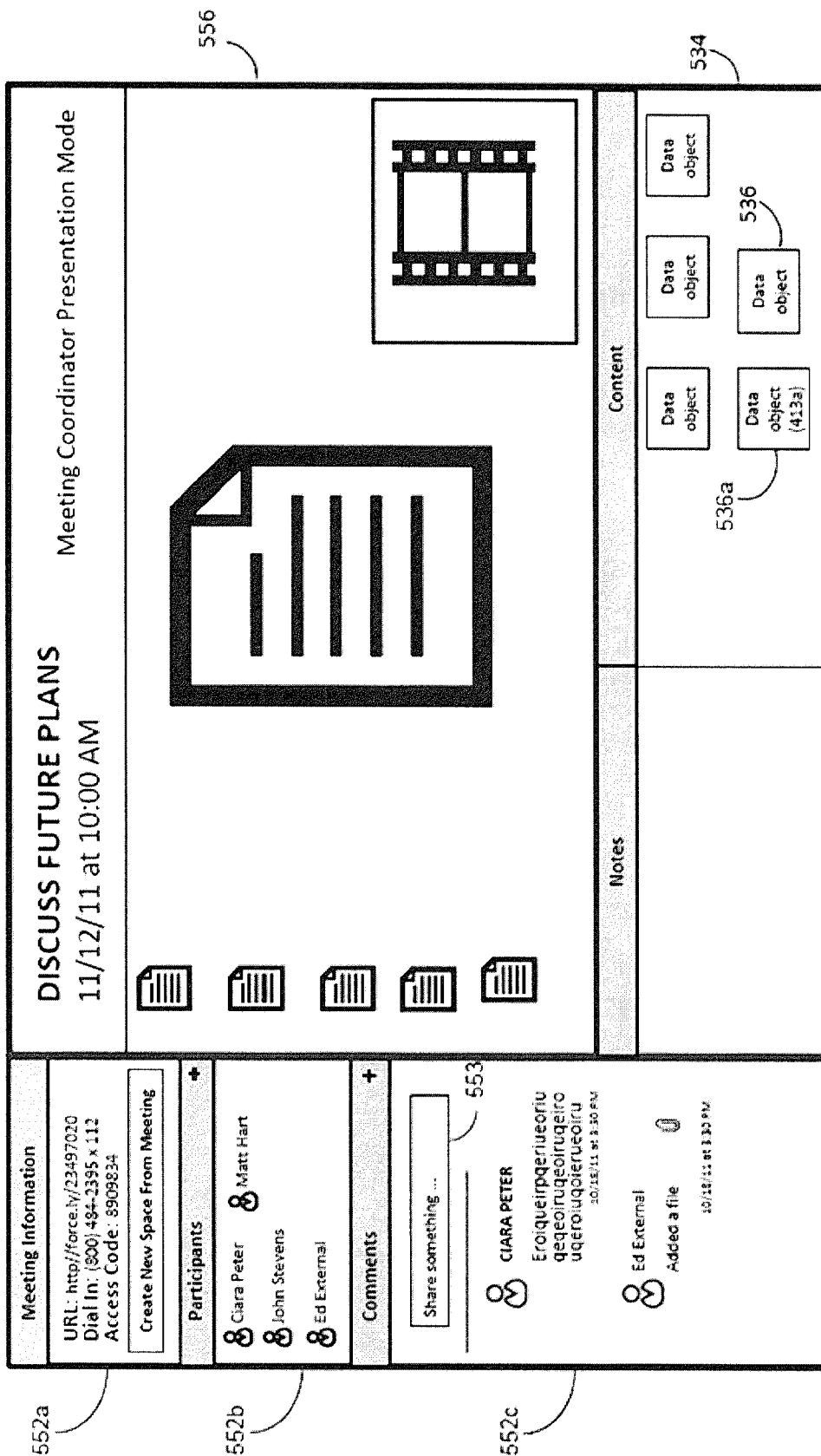
FIG. 5C illustrates a web page representing to an exemplary virtual meeting room according to another embodiment.

FIG. 5C illustrates a web page representing an exemplary virtual meeting room 420 provided to a meeting coordinator 504 according to an embodiment. The meeting coordinator's virtual meeting room web page 530 can be similar to the participant's virtual meeting room web page 520 illustrated in FIG. 5B. That is, it can include a presentation window for meeting information 552a and presentation windows for displaying profile images 552b of each meeting participant 203, for displaying real-time comments 552c, for entering notes 554, and for displaying meeting content 556 during the meeting. In addition, the meeting coordinator's meeting room web page 530 can include a presentation window 534 for displaying icons 536 representing the data objects 413a, 413b of the planning content 412 uploaded as meeting content 422. According to an embodiment, the meeting coordinator 204 can select content for presentation during the meeting by clicking on an icon, e.g., 536a, corresponding to the desired content, e.g., data object 413a, and dragging the icon 536a into the presentation window 556 for displaying meeting content. Such an action can automatically generate the indication to present meeting content, which is then transmitted to the meeting room handler 314.

In response to receiving the indication, the meeting room handler 314 can be configured to provide the selected data object 413a in the meeting participant's virtual meeting room web page 520 such that the meeting participants 203 have visual access to the meeting content 422 comprising the at least one data object of the planning content 412. According to an embodiment, when the selected data object 413a is presented, the planning space handler 312 can be configured to store the selected data object 413a as content presented 423 during the meeting and to link the selected data object 413a to the virtual meeting room 420 so that the meeting participants 203 can access the presented data object 413a via the virtual meeting room 420 at a later time, e.g., after the meeting.

According to exemplary embodiments, the plurality of meeting participants 203 can access the virtual meeting room 420 from any location and from any user system node 202 because the virtual meeting room 420 is located in the cloud computing environment and can be accessed over the Internet 230. During the presentation phase, meeting content 422 for the meeting can be stored in a central location, i.e., the virtual meeting room 420, where it can be easily organized, categorized, retrieved and presented. Text comments and video/audio feeds can be transmitted in real time through the virtual meeting room 420 so that the meeting participants 203 can interact with each other without being in the same physical location.

The Post-Presentation Phase of the Meeting

When the meeting is concluded, the presentation phase is complete and the post-presentation phase begins. In an embodiment, the virtual meeting room 420 associated with the meeting remains "open" to the meeting participants 203 and to the meeting collaborators 201. In the post-presentation phase, however, the virtual meeting room 420 no longer is a shared space for collaboration. Rather, in this phase, the virtual meeting room 420 can be a space to access information exchanged during the meeting. As indicated above, in an embodiment, the content presented 423 and video/audio data from the meeting can be recorded and stored in the meeting block 400 and associated with the virtual meeting room 420. Accordingly, a meeting participant 203b and/or meeting collaborator 201a can review information discussed and/or presented during the meeting via the virtual meeting room 420.

For example, a meeting participant 203b can retrieve, display and/or download the data object(s) 413a presented during the meeting by transmitting a request to access the virtual meeting room 420 to the meeting facilitator service 300 over the network 230. The meeting room handler 314 can be configured to receive the request and can be configured to authenticate the user and verify that the user is authorized to access the virtual meeting room 420. Upon granting access to the virtual meeting room 420, the meeting room handler 314 can, in an embodiment, receive requests for content presented 423 during the meeting and can be configured to retrieve requested content from the data store 320 via the data manager 308. The requested content can be provided to the meeting participant 203b via the virtual meeting room 420 and/or via another other suitable means.

According to an embodiment, upon request or automatically, the meeting room handler component 314 can also be configured to generate a follow-up task list 424 comprising a plurality of follow-up tasks that need to be completed after the meeting. For example, the meeting facilitator service 300 can receive an indication from the meeting coordinator 204 and/or from a meeting participant 203b over the network 230 that includes a command to create a follow-up task list 424 for the meeting. When received, the planning space handler 312 can, in an embodiment, provide a follow-up task list template to the meeting coordinator 204 or meeting participant 203b, which allows the coordinator 204/participant 203b to define the plurality of follow-up tasks. Alternatively, or in addition, the meeting room handler 314 can present a menu of typical follow-up tasks, and the coordinator 204/participant 203b can be allowed to select tasks from the menu.

In an embodiment, when the follow-up tasks have been defined, the meeting room handler 314 can be configured to assign a meeting collaborator 201 and/or a meeting participant 203 to perform at least one follow-up task on the list 424. The meeting room handler 314 can be configured to assign a follow-up task(s) automatically to a meeting collaborator 201/participant 203 based on a role or skill of the collaborator 201/participant 203. Alternatively or in addition, in another embodiment, the meeting coordinator 204/participant 203b can explicitly assign follow-up task(s) to particular collaborator(s) 201/participants 203, and/or tasks can be chosen voluntarily. The follow-up task assignments can be included with the task list 424 in an embodiment.

The meeting room handler 314 can further be configured to associate the follow-up task list 424 with either or both of the virtual planning space 410 and the virtual meeting room 420 associated with the meeting so that the follow-up task list 424 and task assignments can be displayed to the meeting collaborators 201 and/or meeting participants 203. For example, in an embodiment, the follow-up task list 424 and the task assignments can be displayed in a presentation window (not shown) in the virtual planning space web page 500 and/or in the virtual meeting room web page 520, 530. In this manner, meeting collaborators 201 and/or meeting participants 203 can monitor and track which follow-up tasks are completed, and can distribute workloads seamlessly and transparently between meeting collaborators 201/participants 203. According to an embodiment, the meeting room handler 314 can also store the follow-up task list 424 and the task assignments in the meeting block 400 associated with the meeting.

System Overview

Figure 6:
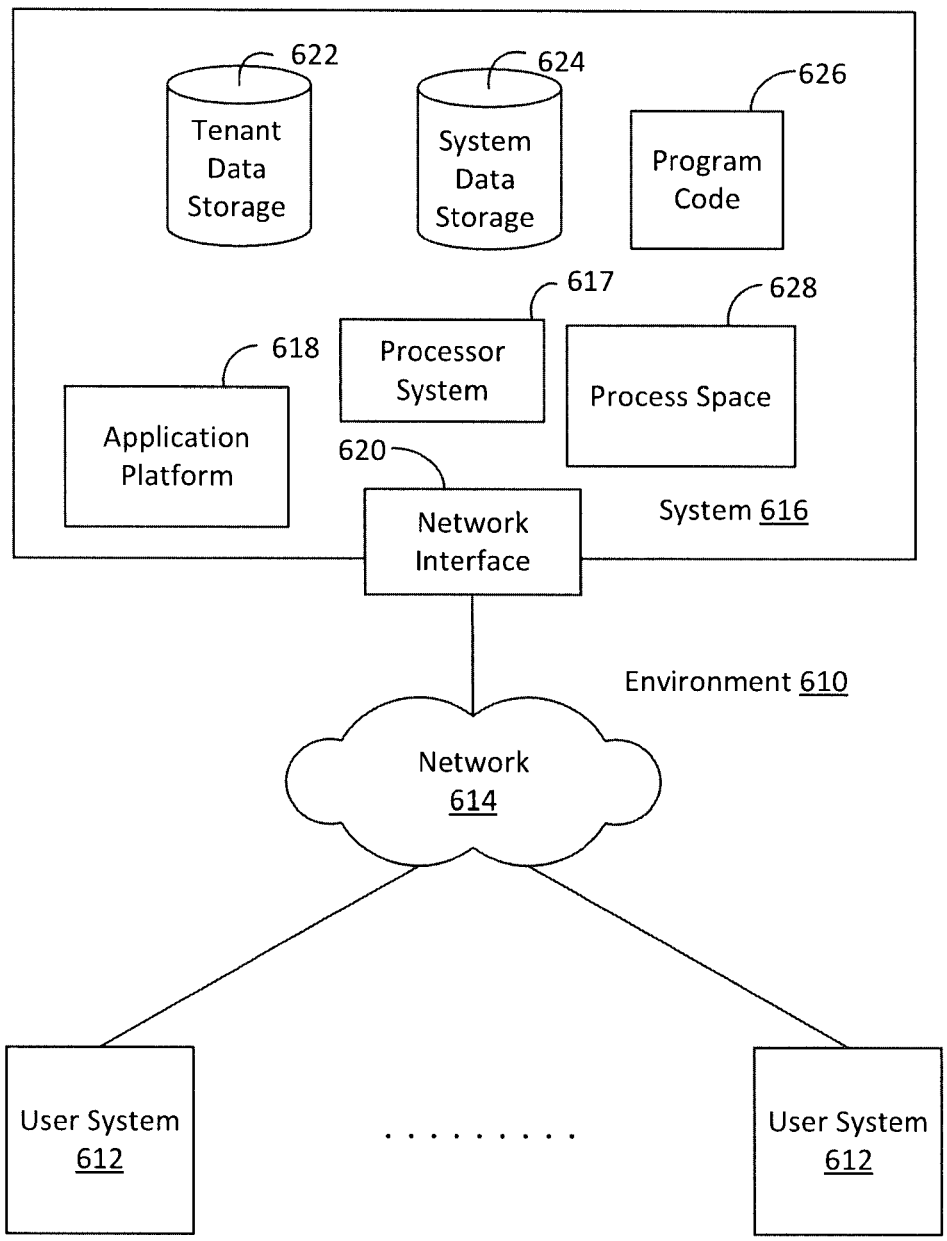
FIG. 6 illustrates a block diagram of an example of an environment where an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application (s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
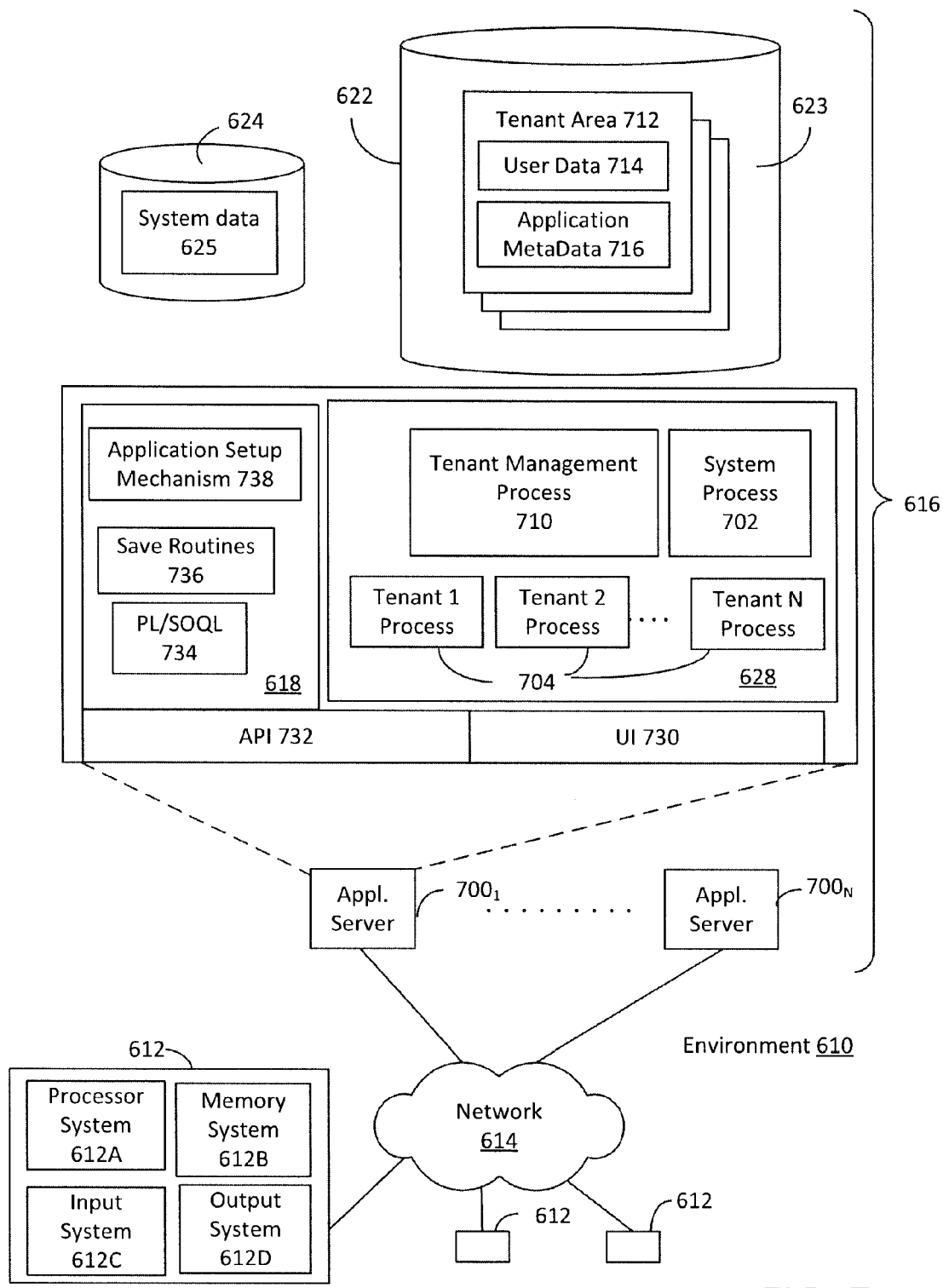
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user data storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers $700_1$-$700_N$, an application platform 618, tenant data storage 622, and system data storage 624. Also shown is system process space 702, including individual tenant process spaces 704 and a tenant management process space 710. Each application server $700_1$-$700_N$ may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user data storage 714 and application metadata 716 might be similarly allocated for each user. For example, a copy of a user's most recently used (MRU) items might be stored to user data storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data 623 and the system data 625 may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by one or more system processes, which manages retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server $700_1$-$700_N$ is configured to handle requests for any user associated with any organization that is a tenant. Because it is desirable to be able to add and remove application servers from the server pool at any time for any reason, there is preferably no server affinity for a user and/or organization to a specific application server $700_1$-$700_N$. In one embodiment, therefore, an interface system implementing a load balancing function (e.g., an F5 Big-IP load balancer) is communicably coupled between the application servers $700_1$-$700_N$ and the user systems 612 to distribute requests to the application servers $700_1$-$700_N$. In one embodiment, the load balancer uses a least connections algorithm to route user requests to the application servers $700_1$-$700_N$. Other examples of load balancing algorithms, such as round robin and observed response time, also can be used. For example, in certain embodiments, three consecutive requests from the same user could hit three different application servers $700_1$-$700_N$, and three requests from different users could hit the same application server $700_1$-$700_N$. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers $700_1$-$700_N$ to request and update system-level and tenant-level data from system 616 that may require sending one or more queries to tenant data storage 622 and/or system data storage 624. System 616 (e.g., an application server $700_1$ in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations and techniques have been described with reference to an embodiment in which techniques for providing machine status information in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for presenting a meeting in a cloud computing environment, the method comprising:

providing by a server a virtual planning space in a cloud computing environment, wherein the virtual planning space is associated with a meeting and is associated with planning content uploaded by a plurality of meeting collaborators who are involved in planning the meeting, the planning content comprising at least one data object and a plurality of planning comments from the plurality of meeting collaborators during a planning phase of the meeting;

receiving by the server an indication to launch the meeting;

generating by the server, in response to receiving the indication to launch, a virtual meeting room associated with the meeting and an identifier for the virtual meeting room;

transmitting by the server a message to a plurality of meeting participants, the message including an invitation to attend the meeting and the identifier for the virtual meeting room;

presenting by the server meeting content comprising the at least one data object of the planning content to the plurality of meeting participants via the virtual meeting room, wherein the meeting content also comprises a plurality of meeting comments from the plurality of meeting participants during a presentation phase of the meeting;

generating, by the server, a follow-up task list comprising a plurality of follow-up tasks, after the presentation phase of the meeting; and associating the follow-up task list with at least one of the virtual planning space and the virtual meeting room, wherein the follow-up task list is accessible by at least one of the plurality of meeting collaborators via the virtual planning space and the plurality of meeting participants via the virtual meeting room.

2. The method of claim 1 wherein the virtual meeting room is a webpage and the identifier is a uniform resource locator (URL) associated with the virtual meeting room, wherein the webpage is accessed by the plurality of meeting participants via the URL.

3. The method of claim 1 further comprising:
receiving by the server an indication to present meeting content, wherein the indication includes information identifying the meeting and an identifier associated with a data object selected for presentation; and
providing the selected data object in a presentation window in the virtual meeting room such that the meeting participants have visual access to the meeting content comprising at least one data object of the planning content.

4. The method of claim 3 wherein the indication to present the meeting content is received from a meeting coordinator, and wherein the meeting coordinator is one of the plurality of meeting collaborators.

5. The method of claim 3 wherein a data storage block is associated with the meeting and located in a multi-tenant on-demand database system, and the method further comprises storing the data object selected for presentation in the data storage block associated with the meeting.

6. The method of claim 1 wherein a data storage block is associated with the meeting and is located in a multi-tenant on-demand database system, and the method further comprises:
receiving by the server real-time text comments from the plurality of meeting participants, and posting the text comments in the virtual meeting room; and
storing the text comments in the data storage block associated with the meeting.

7. The method of claim 6 further comprising:
receiving by the server at least one of video data and audio data corresponding to activities of the plurality of meeting participants during the meeting;
recording in real-time the at least one video data and audio data; and
storing the recorded data in the data storage block associated with the meeting.

8. The method of claim 1 further comprising assigning at least one of a meeting participant and a meeting collaborator to perform at least one follow-up task.

9. A machine-readable medium carrying one or more sequences of instructions for presenting a meeting in a cloud computing environment, which instructions, when executed by one or more processors, cause the one or more processors to carry out the steps of:
providing a virtual planning space in a cloud computing environment, wherein the virtual planning space is associated with a meeting and is associated with planning content uploaded by a plurality of meeting collaborators who are involved in planning the meeting, the planning content comprising at least one data object and a plurality of planning comments from the plurality of meeting collaborators during a planning phase of the meeting;
receiving an indication to launch the meeting;
generating, in response to receiving the indication to launch, a virtual meeting room associated with the meeting and an identifier for the virtual meeting room;
transmitting a message to a plurality of meeting participants, the message including an invitation to attend the meeting and the identifier for the virtual meeting room;
presenting meeting content comprising the at least one data object of the planning content to the plurality of meeting participants via the virtual meeting room, wherein the meeting content also comprises a plurality of meeting comments from the plurality of meeting participants during a presentation phase of the meeting;
generating a follow-up task list comprising a plurality of follow-up tasks, after the presentation phase of the meeting; and
associating the follow-up task list with at least one of the virtual planning space and the virtual meeting room, wherein the follow-up task list is accessible by at least one of the plurality of meeting collaborators via the virtual planning space and the plurality of meeting participants via the virtual meeting room.

10. An apparatus for presenting a meeting in a cloud computing environment, the apparatus comprising:
a processor; and
one or more stored sequences of instructions which, when executed by the processor, cause the processor to carry out the steps of:
providing a virtual planning space in a cloud computing environment, wherein the virtual planning space is associated with a meeting and is associated with planning content uploaded by a plurality of meeting collaborators who are involved in planning the meeting, the planning content comprising at least one data object and a plurality of planning comments from the plurality of meeting collaborators during a planning phase of the meeting;
receiving an indication to launch the meeting;
generating, in response to receiving the indication to launch, a virtual meeting room associated with the meeting and an identifier for the virtual meeting room;
transmitting a message to a plurality of meeting participants, the message including an invitation to attend the meeting and the identifier for the virtual meeting room;
presenting meeting content comprising the at least one data object of the planning content to the plurality of meeting participants via the virtual meeting room, wherein the meeting content also comprises a plurality of meeting comments from the plurality of meeting participants during a presentation phase of the meeting;
generating a follow-up task list comprising a plurality of follow-up tasks, after the presentation phase of the meeting; and
associating the follow-up task list with at least one of the virtual planning space and the virtual meeting room, wherein the follow-up task list is accessible by at least one of the plurality of meeting collaborators via the virtual planning space and the plurality of meeting participants via the virtual meeting room.

11. The apparatus of claim 10 wherein the virtual meeting room is a webpage and the identifier is a uniform resource locator (URL) associated with the virtual meeting room, wherein the webpage is accessed by the plurality of meeting participants via the URL.

12. The apparatus of claim 10 further comprising instructions which, when executed by the processor, cause the processor to carry out the steps of:
receiving an indication to present meeting content, wherein the indication includes information identifying the meeting and an identifier associated with a data object selected for presentation; and
providing the selected data object in a presentation window in the virtual meeting room such that the meeting participants have visual access to the meeting content comprising at least one data object of the planning content.

13. The apparatus of claim 12 wherein the indication to present the meeting content is received from a meeting coordinator, and wherein the meeting coordinator is one of the plurality of meeting collaborators.

14. The apparatus of claim 12 wherein a data storage block is associated with the meeting and located in a multi-tenant on-demand database system, and the method further comprises instructions which, when executed by the processor, cause the processor to carry out the steps of storing the data object selected for presentation in the data storage block associated with the meeting.

15. The apparatus of claim 10 wherein a data storage block is associated with the meeting and is located in a multi-tenant on-demand database system, and the apparatus further comprises instructions which, when executed by the processor, cause the processor to carry out the steps of:
receiving real-time text comments from the plurality of meeting participants, and posting the text comments in the virtual meeting room; and
storing the text comments in the data storage block associated with the meeting.

16. The apparatus of claim 15 further comprising instructions which, when executed by the processor, cause the processor to carry out the steps of:
receiving at least one of video data and audio data corresponding to activities of the plurality of meeting participants during the meeting;
recording in real-time the at least one video data and audio data; and
storing the recorded data in the data storage block associated with the meeting.

17. The apparatus of claim 10 further comprising instructions which, when executed by the processor, cause the processor to carry out the steps of assigning at least one of a meeting participant and a meeting collaborator to perform at least one follow-up task.

18. A method for transmitting code for presenting a meeting in a cloud computing environment, the method comprising:
transmitting code to provide by a server a virtual planning space in a cloud computing environment, wherein the virtual planning space is associated with a meeting and is associated with planning content uploaded by a plurality of meeting collaborators who are involved in planning the meeting, the planning content comprising at least one data object and a plurality of planning comments from the plurality of meeting collaborators during a planning phase of the meeting;
transmitting code to receive by the server an indication to launch the meeting;
transmitting code to generate by the server a virtual meeting room associated with the meeting and an identifier for the virtual meeting room in response to receiving the indication to launch the meeting;
transmitting code to transmit by the server a message to a plurality of meeting participants, the message including an invitation to attend the meeting and the identifier for the virtual meeting room;
transmitting code to present by the server meeting content comprising the at least one data object of the planning content to the plurality of meeting participants via the virtual meeting room, wherein the meeting content also comprises a plurality of meeting comments from the plurality of meeting participants during a presentation phase of the meeting;
transmitting code to generate a follow-up task list comprising a plurality of follow-up tasks, after the presentation phase of the meeting; and
transmitting code to associate the follow-up task list with at least one of the virtual planning space and the virtual meeting room, wherein the follow-up task list is accessible by at least one of the plurality of meeting collaborators via the virtual planning space and the plurality of meeting participants via the virtual meeting room.

* * * * *